United States Patent
Lopez et al.

(10) Patent No.: US 12,483,467 B1
(45) Date of Patent: Nov. 25, 2025

(54) DYNAMICALLY INJECTED YANG MODULES

(71) Applicant: Hewlett Packard Enterprise Development LP, Spring, TX (US)

(72) Inventors: David Corrales Lopez, Heredia (CR); Francisco José Rojas Fonseca, Alajuela (CR); Daniel Gerardo Canessa Valverde, Alajuela (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 22 days.

(21) Appl. No.: 18/784,559

(22) Filed: Jul. 25, 2024

(51) Int. Cl.
*H04L 41/0659* (2022.01)
*H04L 41/0668* (2022.01)

(52) U.S. Cl.
CPC ...... *H04L 41/0659* (2013.01); *H04L 41/0668* (2013.01)

(58) Field of Classification Search
CPC .......... H04L 41/0659; H04L 41/0668
See application file for complete search history.

(56) References Cited

U.S. PATENT DOCUMENTS

| | | | | |
|---|---|---|---|---|
| 2021/0149987 | A1* | 5/2021 | Ji | G06F 16/2228 |
| 2022/0255818 | A1* | 8/2022 | Zhang | H04L 63/0435 |
| 2023/0076130 | A1* | 3/2023 | Wen | G06F 11/3495 |
| 2023/0231767 | A1* | 7/2023 | Fordos | H04L 41/0816 |
| | | | | 709/221 |
| 2024/0073791 | A1* | 2/2024 | Thyagarajan | H04L 5/0048 |
| 2024/0085477 | A1* | 3/2024 | Turman | H04Q 9/00 |

* cited by examiner

*Primary Examiner* — Michael A Keller
*Assistant Examiner* — Thao D Duong
(74) *Attorney, Agent, or Firm* — Yao Legal Services, Inc

(57) ABSTRACT

One aspect describes a method, a computer system, and a computer-readable medium that facilitate the injection of customized YANG views to a network device. A network device runs a Yet Another Next Generation (YANG) server to provide telemetry data associated with the network device, the telemetry data defined by a YANG model. In response to receiving, from a remote client, a customized YANG view file, the YANG server determines whether the customized YANG view file contains an error. In response to determining that the customized YANG view file does not contain an error, the YANG server activates the customized YANG view file without upgrading the network device's firmware and rebooting the network device. The YANG server receives a query from the remote client specifying the customized YANG view file, gathers telemetry data based on the customized YANG view file, and returns the gathered telemetry data to the remote client.

20 Claims, 7 Drawing Sheets

DYNAMICALLY INJECTED YANG MODULES

BACKGROUND

This disclosure is generally related to providing telemetry data using Yet Another Next Generation (YANG) data models. More specifically, this disclosure is related to injecting customized YANG modules into a network device without the need to update the firmware image of the network device.

BRIEF DESCRIPTION OF THE FIGURES

In the figures, like reference numerals refer to the same figure elements.

DETAILED DESCRIPTION

Figure 1:
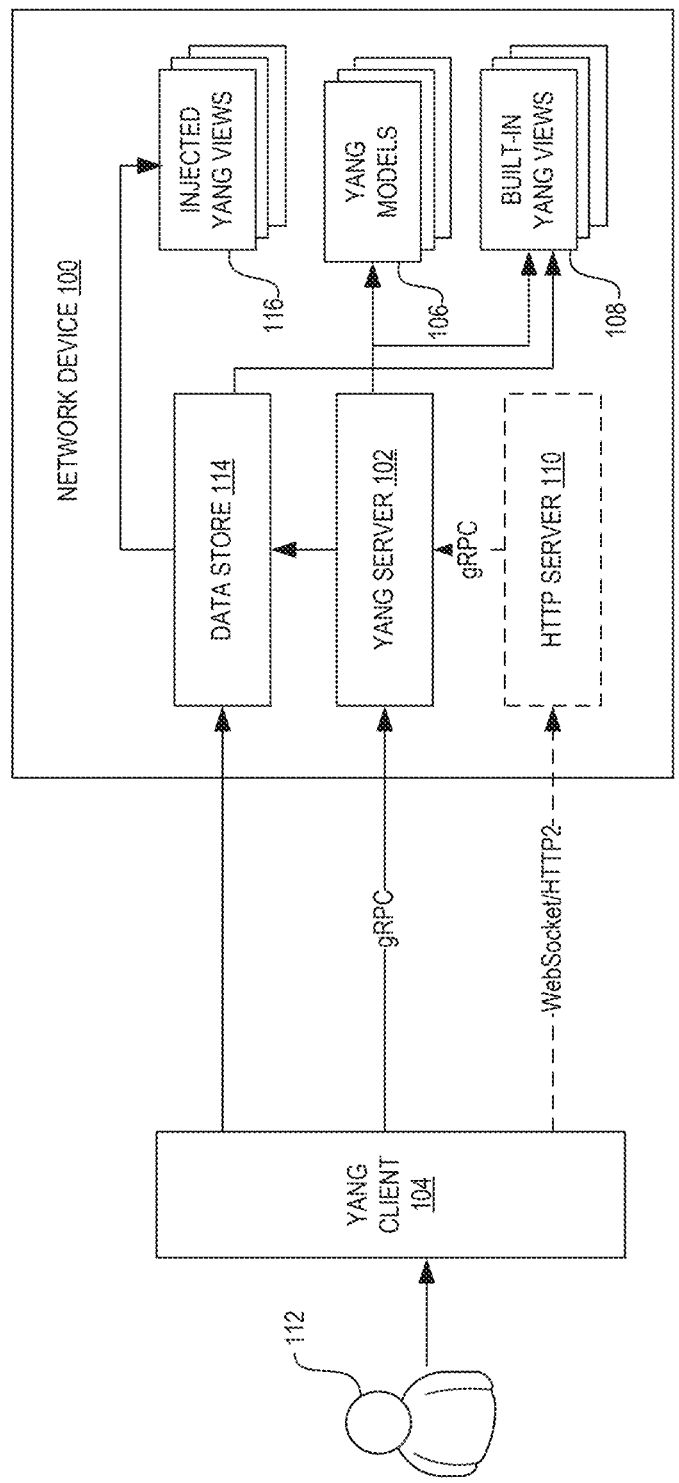
FIG. 1 illustrates an example of YANG client-server architecture, according to one aspect of the instant application.

Telemetry is commonly used to collect, analyze, and report data about the status, performance, and operation of a network. A telemetry process involves gathering detailed information from network devices and traffic flows, which is then used for monitoring, troubleshooting, optimizing, and securing the network.

Network data collection on a large scale is becoming a tedious task for monitoring and troubleshooting. There is a need to collect data regarding the different operational aspects of devices in the network. For example, telemetry data of a network switch may include Bidirectional Forwarding Detection (BFD) data, Virtual Local Area Network (VLAN) data, Border Gateway Protocol (BGP) data, etc. Such data may be collected from different areas of the network device and stored in various data tables. Depending on the needs, telemetry data may be extracted from multiple sources (i.e., data tables). In conventional approaches, the data consumer may need to query each data source separately, which can be time and bandwidth-consuming.

Yet Another Next Generation (YANG) is a protocol-independent data modeling language. It provides a standard way to model the operational and configuration data of network devices and may be used for network telemetry. To facilitate network telemetry based on YANG models, network devices can provide access to YANG models built into their firmware. For example, a network device may run a YANG server, which exposes a YANG-based application programming interface (API). These built-in YANG models can be queried by YANG clients, which access the YANG-based API programmatically. Examples of the YANG clients may include but are not limited to a microservice, a network management system (NMS), a script, compiled codes, etc. In one example, the YANG client may be part of a cloud-based NMS. The built-in YANG models may be queried by clients via a reverse WebSocket proxy or Hypertext Transfer Protocol Version 2 (HTTP2) using the gRPC Remote Procedure Calls (gRPC) protocol. A YANG model can define a hierarchical tree structure where data is mapped into nodes. A YANG model may include one or more modules and submodules, with each module/submodule describing a data model representing a given feature (e.g., BFD, VLAN, BGP, etc.) or area (e.g., port, CPU, memory, etc.) of the network device to be monitored and/or configured. A YANG module/submodule may include nodes of different types, such as leaf nodes, leaf-list nodes, container nodes, and list nodes.

In addition to the built-in YANG models, the firmware of the network device may also provide a number of built-in YANG views. A YANG view is a special case of a YANG module and may import and/or include existing YANG modules of submodules from a plurality of YANG models. It is named YANG view because it resembles a Structured Query Language (SQL) view. SQL is a domain-specific language used to manage data, especially in a relational database management system (RDBMS). SQL is particularly useful in handling structured data, i.e., data incorporating relations among entities and variables. An SQL view refers to a virtual table containing data from one or more base tables and may be created by selecting fields from the base tables using an SQL statement. Like the SQL view, the YANG view can provide a mechanism to organize the existing telemetry data from multiple sources (or base tables) into a single "view." YANG views can add flexibility and data aggregation facilities unavailable in standard YANG modules. For example, a BFD YANG view can aggregate the global BFD configuration and status data alongside per-port BFD overrides and statistics. Like the built-in YANG models, YANG views can be built into the firmware of a network device.

Although the built-in YANG views provide a certain level of flexibility in terms of what type of telemetry data may be collected and aggregated, modifications to these built-in YANG views often require a firmware upgrade. However, it may take time for the device vendor to upgrade their firmware. Such a delay may hinder the ability of the NMS developers and the network administrators to add new YANG modules or modify existing YANG modules. For example, if the NMS developers or customers want a new network monitoring feature that requires a new way to aggregate the operational data of a network device, they need to send their request to the firmware development team of the network device and wait for the release of a firmware upgrade. This is a lengthy process, often leading to poor customer experience. To improve customer experience, according to some aspects of the instant application, YANG modules or views can be dynamically injected into a network device to allow network administrators to define newer data groupings and hierarchy to suit their telemetry needs better.

According to some aspects of the instant application, a network administrator may be provided the freedom to mix and match leaves, lists, containers, and groupings from different modules of one or more YANG model trees to create a customized YANG view, which can be a single, aggregated view of the data represented by various YANG models. The customized YANG view can be injected into a network device during runtime without upgrading the network device's firmware. For simplicity of expression, after a "customized YANG view" is injected into the network device, it may be referred to as an "injected YANG view." In some examples, YANG view files (i.e., .yang files) may be injected into a datastore maintained by the network device. Note that the .yang files are text-based files used to represent YANG views. In this disclosure, the terms "YANG view file" and "YANG view" may be used interchangeable. The YANG server running on the network device can validate and activate the injected YANG views, making them accessible to clients without the need to recompile and restart the YANG server. Once the injected YANG views are validated, activated, and loaded into the server memory, they may behave in the same fashion as built-in YANG modules and views. Clients may query the injected YANG views the same way they query the built-in YANG views. A YANG server allows multiple injected YANG views to co-exist as long as they are named differently. An injected YANG view may also be updated or removed during runtime, even with requests for the previous or deleted version still being processed.

FIG. 1 illustrates an example of YANG client-server architecture, according to one aspect of the instant application. In FIG. 1, a network device 100 may execute a YANG server 102, which exposes a YANG-based API to allow a YANG client 104 to gain access to a number of YANG models 106 and built-in YANG views 108. In one example, YANG client 104 may be part of a cloud-based NMS. Each YANG model can include a plurality of YANG modules and submodules organized into a hierarchical tree structure, with each module/submodule defining data associated with a particular feature or area of network device 100. Each YANG view (e.g., a built-in view or an injected view) can combine modules/submodules from YANG models 106, present them in a consolidated fashion, and add YANG-specific structural elements (e.g., hierarchies) on top. Both YANG models 106 and built-in YANG views 108 can be part of the firmware of network device 100. In some examples, YANG server 102 may be a gRPC server, and YANG client 104 can be a gRPC client. YANG client 104 may query a built-in YANG view by sending a gRPC request to YANG server 102. Note that gRPC is a modern open-source high performance Remote Procedure Call (RPC) framework that can run in any environment. It uses HTTP2 for transport, Protocol Buffers as the interface description language, and provides features such as authentication, bidirectional streaming and flow control, blocking or non-blocking bindings, and cancellation and timeouts.

Network device 100 may optionally execute an HTTP server 110, which may communicate with YANG server 102 using gRPC. In such a case, YANG client 104 may be an HTTP client that communicates with HTTP server 110 using WebSocket or HTTP2. For example, when querying a built-in YANG view, YANG client 104 may send an HTTP request to HTTP server 110, which may in turn generate a corresponding gRPC request and send the request to YANG server 102.

An administrator 112 (e.g., a network administrator or operator using YANG client 104) may create customized YANG modules or views (which are not included in built-in YANG views) and inject, via client 104, the customized YANG views into a data store 114 maintained by network device 100. Data store 114 may be transient or persistent and may be implemented using either volatile or non-volatile memory.

YANG server 102 may monitor data store 114 to determine whether a new customized YANG view file (i.e., a .yang file not previously present in data store 114) is injected. The YANG view file is typically in a compressed format. In some examples, the YANG view file may also be accompanied by a protobuf file or .proto file describing how to encode/decode the YANG data (referred to as a proto-definition file). Upon detecting a newly injected YANG view file, YANG server 102 can open/decompress the YANG view file to check for any errors. For example, it may determine whether the YANG view file has the correct file name or whether it includes invalid YANG statements. Error-free YANG view files can be validated and loaded into the memory of YANG server 102 as injected YANG views 116 accessible to YANG client 104.

YANG client 104 may access injected YANG views 116 and built-in YANG views 108 in the same way. For example, YANG client 104 may send a query (e.g., via gRPC) to YANG server 102, specifying a YANG view name, and YANG server 102 may gather the data and organize from different sources based on the specified YANG view, and return the organized data to YANG client 104.

Before creating a customized YANG view, one may need to determine which datasets and what relationships should the YANG view represent. For example, to monitor the BFD status on network devices, an administrator may create a BFD YANG view that aggregates the global BFD configuration/status (i.e., the configuration of BFD for all interfaces across the network) alongside per-port BFD overrides (i.e., the BFD setting for particular interfaces) and statistics. Once the content of the YANG view is determined, the YANG view file may be created using standard YANG semantics. As discussed before, a YANG view can be a specific YANG module that imports (i.e., references) and/or includes modules/submodules from existing YANG models. A YANG view file can be in text format and referred to simply as a YANG (or .yang) file or a YANG module.

After the YANG view files are injected (i.e., deposited into the data store), validated (i.e., determined as error-free), and loaded (i.e., saved in the server memory) by the YANG server, they may be queried by clients to provide corresponding customized YANG views, which may behave in the same fashion as the built-in YANG modules and views. This includes the capability of being serialized in various formats, such as the JavaScript Object Notation (JSON), Google Protocol Buffers (GPB) format, an American Standard Code for Information Interchange (ASCII) code format, or a proprietary binary format. Serialization can convert data objects presented in complex data structures into a byte stream for storage, transfer, and distribution purposes on physical devices.

When JSON is used as the serialization format, the YANG view file (i.e., the .yang file) itself can be sufficient for the YANG server to correctly generate corresponding self-describing JSON objects to return the requested data back to the YANG client. However, if GPB is used for data serialization, both the YANG client and server should have the same proto-definition file (i.e., proto file), which describes the data structure schemas, to successfully encode/decode requests and their responses. This is because GPB is a binary format that is compact but not self-describing (i.e., there is no way to tell the names, meanings, or full datatypes of fields without an external specification). A proto-definition file is text based and also referred to as a GPB definition file. Reconstruction of the data from their serialized format is impossible without a priori knowledge of its internal structure and semantics.

To facilitate GPB-based data serialization, according to some aspects, a software development kit (SDK) that can automatically generate the proto-definition files (referred to as protobuf or proto files) needed by the client and server may be provided. The SDK may be implemented on any computing devices accessible to the administrator. For example, the network device executing the YANG server may be installed with a set of software development tools, which when executed may be used to generate the proto-definition files. In another example, a cloud-based NMS may also provide the SDK and a user interface to allow the administrator to create a YANG view file using the user interface. In some examples, the SDK may take as input the YANG view file created by the administrator and information associated with the existing YANG models to generate the proto-definition files. Because YANG models existing on the network device are typically versioned (e.g., they may be upgraded during the firmware upgrade), the version number of the YANG models or device firmware may be included in the input to the SDK, thereby facilitating the SDK in generating the proto-definition file.

According to some aspects, the automatically generated proto-definition file may be packaged with the YANG view file into a single file package, which contains everything needed by the YANG server to serialize the injected YANG views in GPB format. According to one aspect, the proto-definition file can be packaged with the YANG view file into a compressed tar file (e.g., a .tar.gz file).

Figure 2:
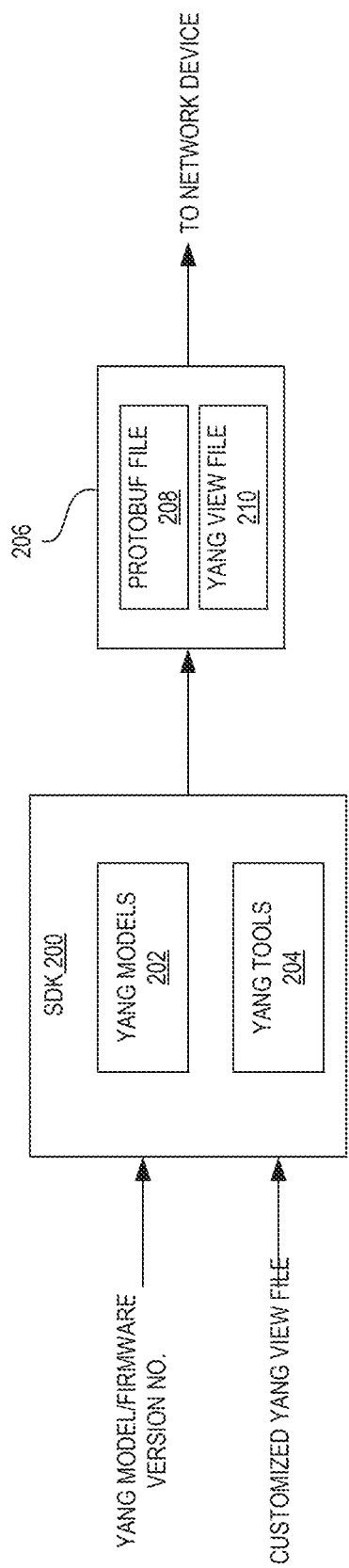
FIG. 2 illustrates an example scenario for injecting a customized YANG view into a network device, according to one aspect of the instant application.

FIG. 2 illustrates an example scenario for injecting a customized YANG view into a network device, according to one aspect of the instant application. In FIG. 2, SDK 200 may be provided by a network device (e.g., a switch, a router, an access point, etc.) implementing the YANG server or an NMS of the network device. SDK 200 may include a plurality of YANG models 202 and YANG tools 204. YANG models 202 may include the YANG models that are built into the firmware of the network devices. Note that there might be multiple versions of the firmware, and YANG models 202 should encompass all models in those versions. YANG tools 204 can include a number of open-source programs (e.g., libraries, compilers, etc.).

A customized YANG view file (which is typically text-based and may be generated using various code editors) and the YANG model or firmware version number may be inputted into SDK 200. A subset of YANG models may be extracted from YANG models 202 based on the firmware version number, and a proto-definition file (which contains information used to describe the encoding/decoding of the data for serialization) may be generated by YANG tools 204 based on the YANG view file and the extracted YANG models. SDK 200 may output a file package 206, which can include proto-definition (protobuf) file 208 (which is generated by YANG tools 204) and YANG view file 210 (which is the same customized YANG view file inputted to SDK 200). According to some aspects, file package 206 can be an archive file (referred to as a tar file). According to further aspects, the tar file can be compressed, resulting in a tarball file (e.g., a .tar.gz file). Other file formats are also possible, as long as they can package multiple files together to facilitate efficient transfer and storage of the files.

File package 206 may be injected into (or transferred to) the network device to facilitate the YANG server running on the network device to provide telemetry data based on YANG view file 210 and protobuf file 208. Protobuf file 208 typically includes a number of messages describing how to serialize the data defined by YANG view file 210. In conventional approaches, protobuf file 208 needs to be sent to a protobuf compiler to generate source codes in various programming languages (such as C, C++, Java, etc.) that can read/write the binary representation of the data. To produce executable binary codes or libraries that can run on the network device, these source codes should be compiled (e.g., using the corresponding C, C++, or Java compiler) into a daemon or library that can run as part of the server codes.

However, including the compiler as part of the server codes can be costly in terms of the firmware image size (as the compiler may require an entire software build stack) and is seen as a security risk. Moreover, each time a YANG view is injected, it would require stopping the service in order to replace the YANG server with a recompiled version containing the newer logic to understand the injected YANG view binary format, described in the protobuf file. To solve this problem, according to some aspects of the instant application, a protobuf file descriptor (which includes executable codes in a binary format) may be generated and dynamically loaded into the running codes of the YANG server, without restarting the YANG server. More specifically, the protobuf file descriptor may be generated based on the customized YANG view file (e.g., file 210), its corresponding text-based protobuf definition file (e.g., file 208), and the YANG models included in the firmware (e.g., models 202). The YANG server may then perform the GPB serialization on the data using the generated proto file descriptor.

Figure 3:
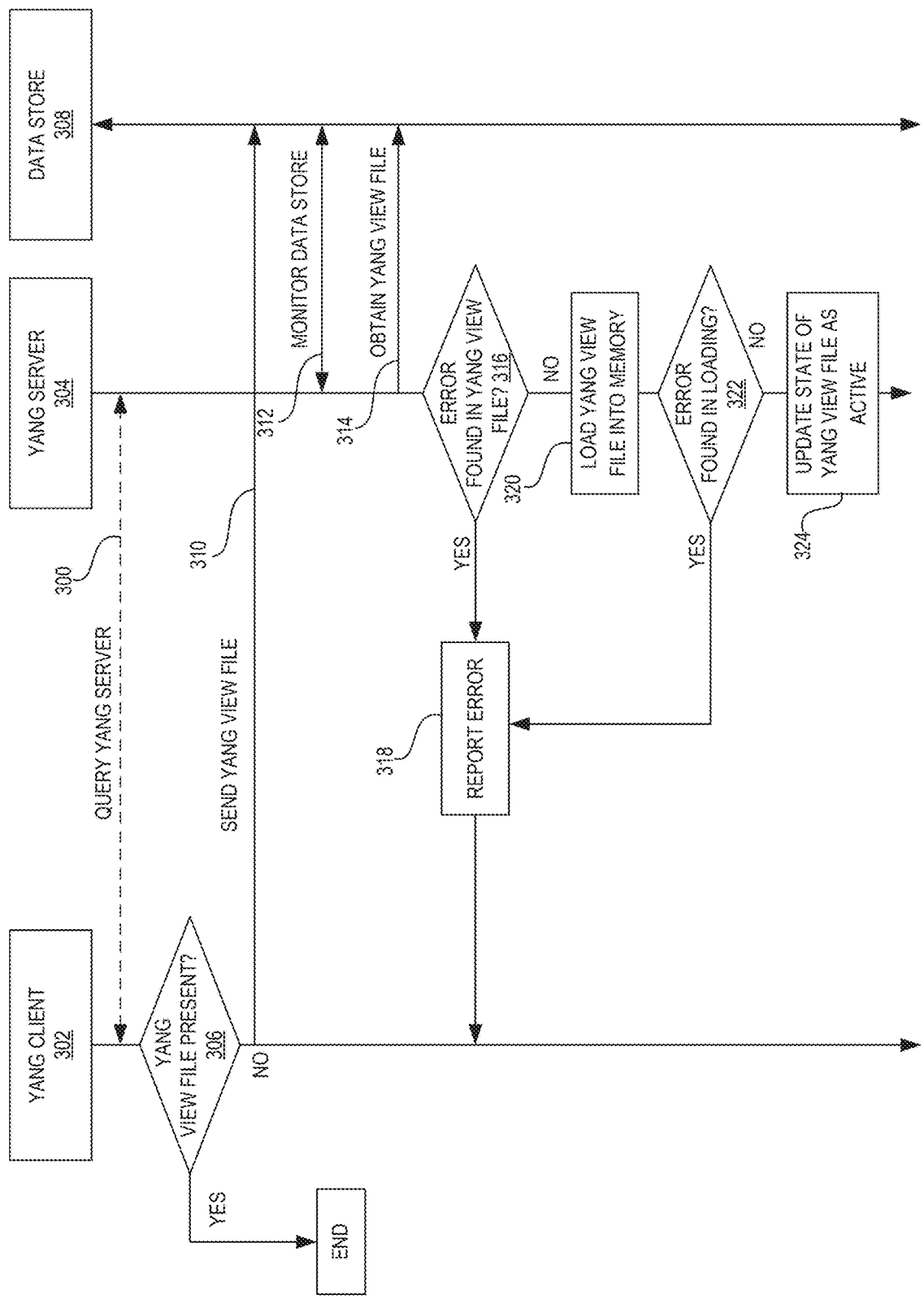
FIG. 3 illustrates an example process for injecting a YANG view, according to one aspect of the instant application.

FIG. 3 illustrates an example process for injecting a YANG view, according to one aspect of the instant application. The YANG view injection process involves a YANG server 304 running on a network device (e.g., a router, a switch, an access point, etc.) and a YANG client 302 embedded in a network management system (NMS) managing the network device. The YANG server may provide a YANG-based API to allow the YANG client to access telemetry data associated with the network device. The telemetry data can be defined by a plurality of YANG models.

Before injecting customized YANG views into the network device, YANG client 302 may optionally query YANG server 304 (operation 300) and determines whether a to-be-injected YANG view file (e.g., a .yang file of the same name and version number) is already present at YANG server 304 (operation 306). This optional step can prevent the reinjection of a YANG view file that already exists on the server to reduce bandwidth waste. According to some aspects, each customized YANG view file can be associated with a version number (provided by YANG client 302) and a hash value (which can be calculated based on the file content), and the query may specify a YANG view name (and optionally a YANG view version number), a firmware version number, and a hash value.

If the customized YANG view file is already present, the process ends. Otherwise, YANG client 302 sends the customized YANG view file to a data store 308 maintained by the network device (operation 310). Data store 308 may be implemented using either non-volatile storage (e.g., a hard drive or a flash drive) or volatile storage (e.g., a random-access memory (RAM) device). In one example, data store 308 can be part of the file system of the host. When JSON is used as the data serialization format, the customized YANG view file can be sent by itself to data store 308. On the other hand, for GPB-based serialization format, the customized YANG view file should be accompanied by a proto-definition file (e.g., a .proto or protobuf file). In such a case, the customized YANG view file and the proto-definition file may be packaged into a single file package (e.g., as a compressed tar file) and sent to data store 308. In one example, the compressed tar file may be a base64-coded .tar.gz file. According to alternative aspects, YANG client 302 may send the customized YANG view file to YANG server 304, and an SDK provided by YANG server 304 may generate the compressed tar file and inject it into data store 308. YANG client 302 may send the customized YANG view file via various interfaces to YANG server 304. In some examples, in addition to running YANG server 304, the network device may also run a Representational State Transfer (REST) server providing a REST API to allow YANG client 302 to send (e.g., via the HTTP PUT method) the customized YANG view file (or the aforementioned file package) to the REST server, which then deposits the file (or file package) into data store 308. YANG client 302 may also send the customized YANG view file (or file package) using other types of interfaces, such as a CLI interface and a Simple Network Management Protocol (SNMP) interface. In one example, YANG client 302 may use the YANG API provided by YANG server 304 directly for sending the YANG view file (or file package).

YANG server 304 monitors data store 308 (operation 312). In response to detecting a new customized YANG view file deposited into data store 308, YANG server 304 may access data store 308 to obtain the customized YANG view file (or file package) (operation 314). If the file is compressed, YANG view server 304 may first decompress the file. YANG server 304 checks the customized YANG view file for errors (operation 316). For example, YANG server 304 may check for formatting or statement errors in the YANG view file. If an error is found, YANG server 304 reports the error to YANG client 302 (operation 318), and the process ends. A customized YANG view file containing an error may be marked as invalid, thus preventing YANG client 302 from accessing the customized YANG view file.

If no error is found, YANG server 304 may load the customized YANG view file into its memory (operation 320) and determine whether the loading encounters an error (operation 322). Note that YANG server 304 may be a process executing on the network device, and its memory may include memory modules in the network device designated for direct access by YANG server 304. If the file loading encounters an error (operation 320), YANG server 304 may report the error to YANG client 302 (operation 318), and the process ends. If the file loading is successful, the state of the YANG view file can be updated to active to allow YANG client 302 to access the customized YANG view file (operation 324). According to some aspects, each customized YANG view file or file package stored in the data store may include metadata indicating the name, type (i.e., whether it is injected), and the state of the customized YANG view file. Examples of the state of the customized YANG view file can include uninitialized, validating, invalid, and active. According to further aspects, the metadata of a customized YANG view file may also include information regarding the reason the customized YANG view file is invalid. In one example, each YANG server can only support a predetermined maximum number of injected YANG views. When the number of injected YANG views reaches the limit, a newly injected YANG view file may be marked as invalid, with the invalid reason being the maximum number of injected views reached.

In the event of GPB-based serialization, the customized YANG view file may be accompanied by a corresponding proto-definition file. YANG server 304 should create a binary, executable proto file descriptor required for the data serialization. According to some aspects, the proto file descriptor may be created (as part of operation 320) based on the customized YANG view file, the corresponding text-based proto-definition file, and the YANG models included in the firmware of the network device. The created proto file descriptor contains all required semantics for serializing the data defined by the customized YANG view file in GPB format and may be loaded into the executable codes of YANG server 304 without recompiling and restarting YANG server 304. If the creation or loading of the proto file descriptor encounters an error, the YANG view file will not become active, and the error will be reported to YANG client 302 (e.g., in the form of an invalid reason listed in the metadata of the YANG view file).

In the example shown in FIG. 3, a new customized YANG view is injected into the YANG server. A similar process may also be used to update or delete a previously injected YANG view. When the updated YANG view file is injected into the network device, the previous version should be kept in an active state until all outstanding requests for the YANG view are serviced. Similarly, when the YANG server receives a request to delete an injected YANG view, the server should keep the to-be-deleted YANG view in the active state until all outstanding requests are serviced. Upon finishing servicing those outstanding requests, the YANG server may delete, from the data store, the older version of the YANG view file in the case of the YANG view update or the YANG view file itself in the case of the YANG view deletion.

Figure 4:
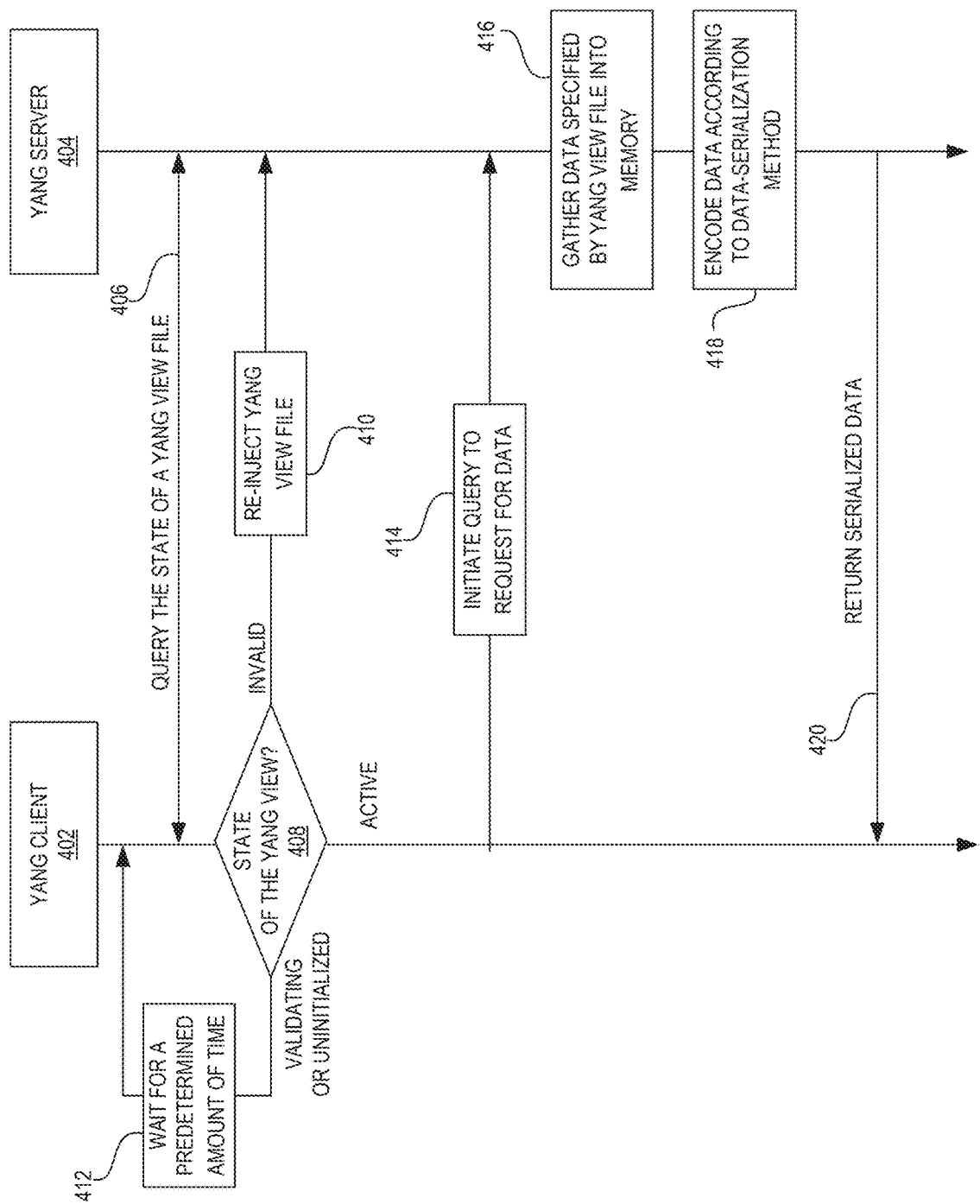
FIG. 4 illustrates an example process for using an injected YANG view, according to one aspect of the instant application.

Once an injected YANG view is validated and activated, it is ready for use by the YANG client in the same way a built-in YANG view is used. FIG. 4 illustrates an example process for using an injected YANG view, according to one aspect of the instant application. In this example, a YANG client 402 sends a query to a YANG server 404 running on the network device to check the state of a particular injected YANG view (operation 406). The query may specify the name of the injected YANG view. In one example, the query can be used to read the metadata associated with the injected YANG view file or file package. Note that this state-query step is needed, because an injected YANG view may not be ready for access (i.e., in the active state) right after YANG client 402 sends the YANG view file to the network device. Before an injected YANG view becomes accessible to YANG client 402, it needs to be validated and activated by YANG server 404 and loaded into the server memory. In the case of the GPB-based serialization, the binary proto file descriptor also needs to be created and loaded onto the memory of YANG server 404. According to some aspects, YANG client 402 may query the state of the injected YANG view via a REST API, YANG API, a CLI, or an SNMP API.

YANG client 402 determines the state of the injected YANG view based on the query result (operation 408). In one example, the query result may include the metadata of the injected YANG view file (which may include the state and, if any, the invalid reason). If the state of the injected YANG view is invalid, YANG client 402 can re-inject the corresponding YANG view file into YANG server 404 (operation 410). If the state of the injected YANG view is validating or uninitialized, YANG client 402 may wait for a predetermined amount of time (e.g., a few seconds or minutes) before resending the query (operation 412). If the state of the injected YANG view is active, YANG client 402 can initiate (e.g., via the YANG API provided by YANG server 404) a query to request data associated with the injected YANG view (operation 414). More specifically, the query can specify the name of the injected YANG view and a data-serialization method (e.g., JSON or GPB). In response, YANG server 404 may gather the corresponding telemetry data from the different data sources (e.g., data tables) specified by the injected YANG view (operation 416) and encode the data according to the data-serialization method (operation 418). YANG server 404 may subsequently return, via the appropriate API, the serialized data to YANG client 402 (operation 420).

Note that the YANG server loads the validated and activated YANG views into its memory, which is volatile. When the network device is rebooted (e.g., after a firmware or software upgrade), the injected YANG views may need to be reloaded from the data store to the server memory. Note that although the data store and the server memory are both storage/memory devices provided by the network device, the server memory refers to the memory location directly accessible to the YANG server. When the YANG server is executed, it may load data from and store data in its memory. The data store may be transient, and its content may disappear after the network device loses power. In such a case, the YANG client running on the NMS may re-inject the YANG views into the YANG server, using a process similar to the one shown in FIG. 3. More specifically, after the network device is rebooted, it is connected to the NMS, and as the part of the initial configuration, the YANG client may inject customized YANG views into the network device.

Figure 5:
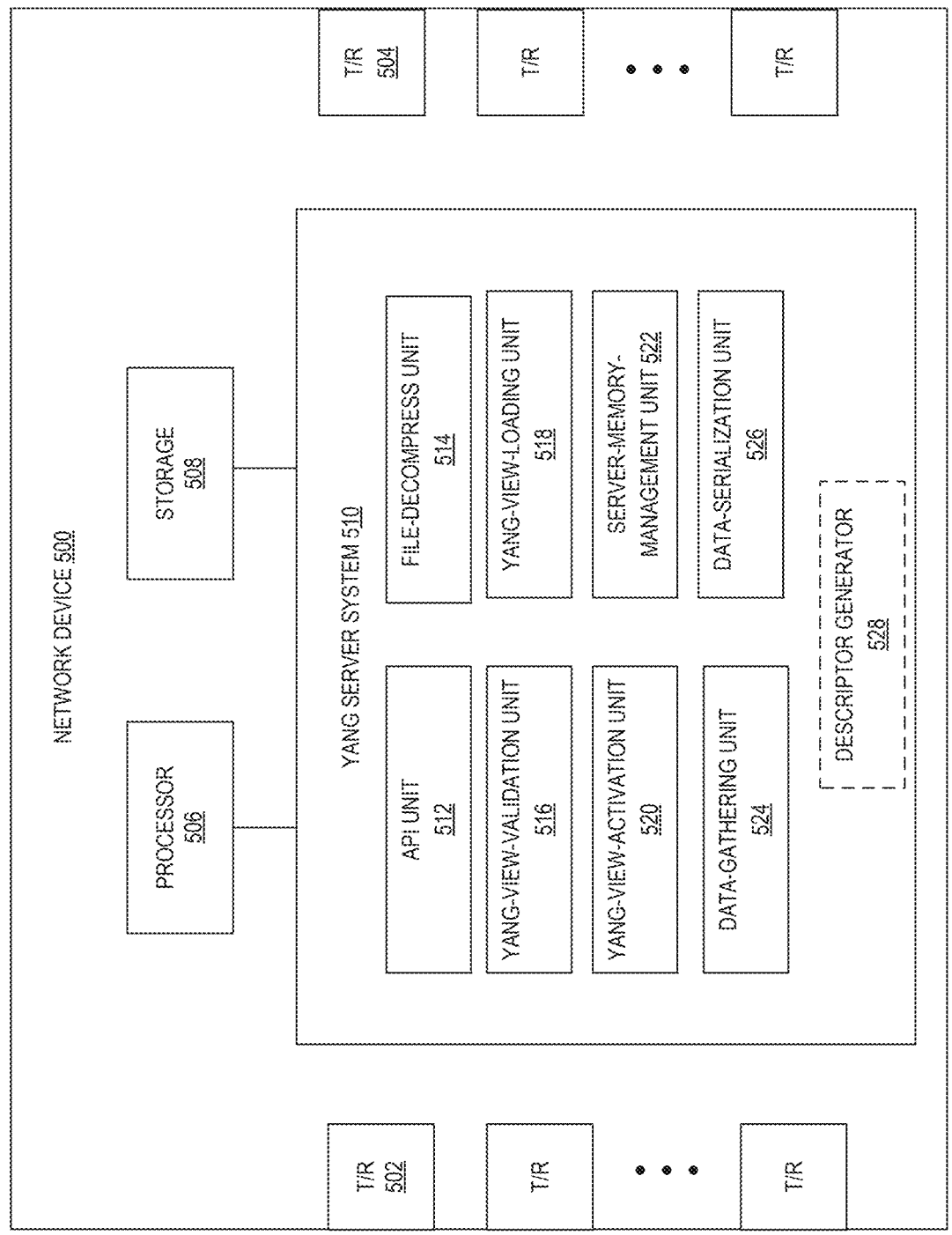
FIG. 5 illustrates an example block diagram of a network device, according to one aspect of the instant application.

FIG. 5 illustrates an example block diagram of a network device, according to one aspect of the instant application. Network device 500 may include any physical devices that allow hardware on a computer network to communicate and interact with one another. Examples of network device 500 may include a switch, a router, a gateway, an access point, a network interface card (NIC), etc. In FIG. 5, network device 500 may include a number of communication ports, such as ports 502 and 504, for communicating with the NMS and peer network devices.

Network device 500 may include a processor 506, a storage device 508, and a YANG server system 510. Storage device 508 can include a data store for storing the YANG view files (or file packages) sent from a management device (e.g., an NMS) of network device 500.

YANG server system 510 may be similar to YANG server 102 and may include any number of software units, hardware units, firmware units that work together to achieve the goal of providing telemetry data based on YANG models. According to some aspects, YANG server system 510 may include an API unit 512, a file-decompress unit 514, a YANG-view-validation unit 516, a YANG-view-loading unit 518, a YANG-view-activation unit 520, a server-memory-management unit 522, a data-gathering unit 524, and a data-serialization unit 526. YANG server system 510 may optionally include a descriptor generator 528. Each unit within YANG server system 510 may be implemented using hardware, software, firmware, or a combination thereof.

API unit 512 may allow a remote YANG client (e.g., a client running in an NMS) to programmatically access YANG server system 510. For example, the remote YANG client may send YANG view files to YANG server system 510 via the API provided by API unit 512. The API may include a gRPC interface shown in FIG. 1. The YANG view files are typically compressed. In one example, each YANG view file may be packaged together with a corresponding proto-definition file to facilitate GPB-base serialization. In a further example, the YANG view file and the accompanying proto-definition file may be packaged into a compressed tar file (e.g., a .tar.gz file). File-decompress unit 514 may be responsible for decompressing the received file or file package.

YANG-view-validation unit 516 may be responsible for validating the decompressed YANG view file. For example, it may determine whether the YANG view file contains errors, such as statement errors or formatting errors. Moreover, YANG-view-validation unit 516 may determine whether the active YANG views reach a predetermined maximum number. If so, YANG-view-validation unit 516 may invalidate any newly injected YANG views. In one example, YANG-view-validation unit 516 may perform operations 316-318 shown in FIG. 3.

YANG-view-loading unit 518 may be responsible for loading the error-free YANG view files into the server memory via server-memory-management unit 522. The server memory can be part of storage device 508. If the loading is successful, YANG-view-activation unit 520 may be responsible for activating the YANG view files. In one example, YANG-view-loading unit 518 may perform operations 320-322 shown in FIG. 3. According to some aspects, when a YANG view file is determined error-free and successfully loaded into the server memory, YANG-view-activation unit 520 can mark the state of the YANG view file as active. For example, the metadata associated with the YANG view file or file package may be updated to indicate that the YANG view is active. The remote YANG client can access activated YANG views without the need to restart the network device. In one example, YANG-view-activation unit 520 may perform operation 324 shown in FIG. 3.

Data-gathering unit 524 may be responsible for gathering the telemetry data from different data sources (e.g., data tables generated by different network logic units, such as the BFD logic unit, the VLAN logic unit, the BGP logic unit, etc.) based on a YANG view queried by the remote client. For example, the YANG view file may specify the modules and submodules (which are similar to columns and rows in different data tables) from the different YANG models to be included in the YANG view for data extraction. In one example, data-gathering unit 524 may perform operation 416 shown in FIG. 4.

Data-serialization unit 526 may be responsible for serializing the telemetry data based on a predetermined data serialization format (e.g., JSON or GPB). If GPB is used for data serialization, the optional descriptor generator 528 may be responsible for generating the binary proto file descriptor used for data serialization. The binary proto file descriptor may be executed along with the server codes, without the need to recompile the server. In one example, data-serialization unit 526 may perform operation 418 shown in FIG. 4. Descriptor generator 528 may generate the binary proto file descriptor based on the YANG view file, the corresponding proto-definition file, and the YANG models included in the firmware of network device 500.

Figure 6:
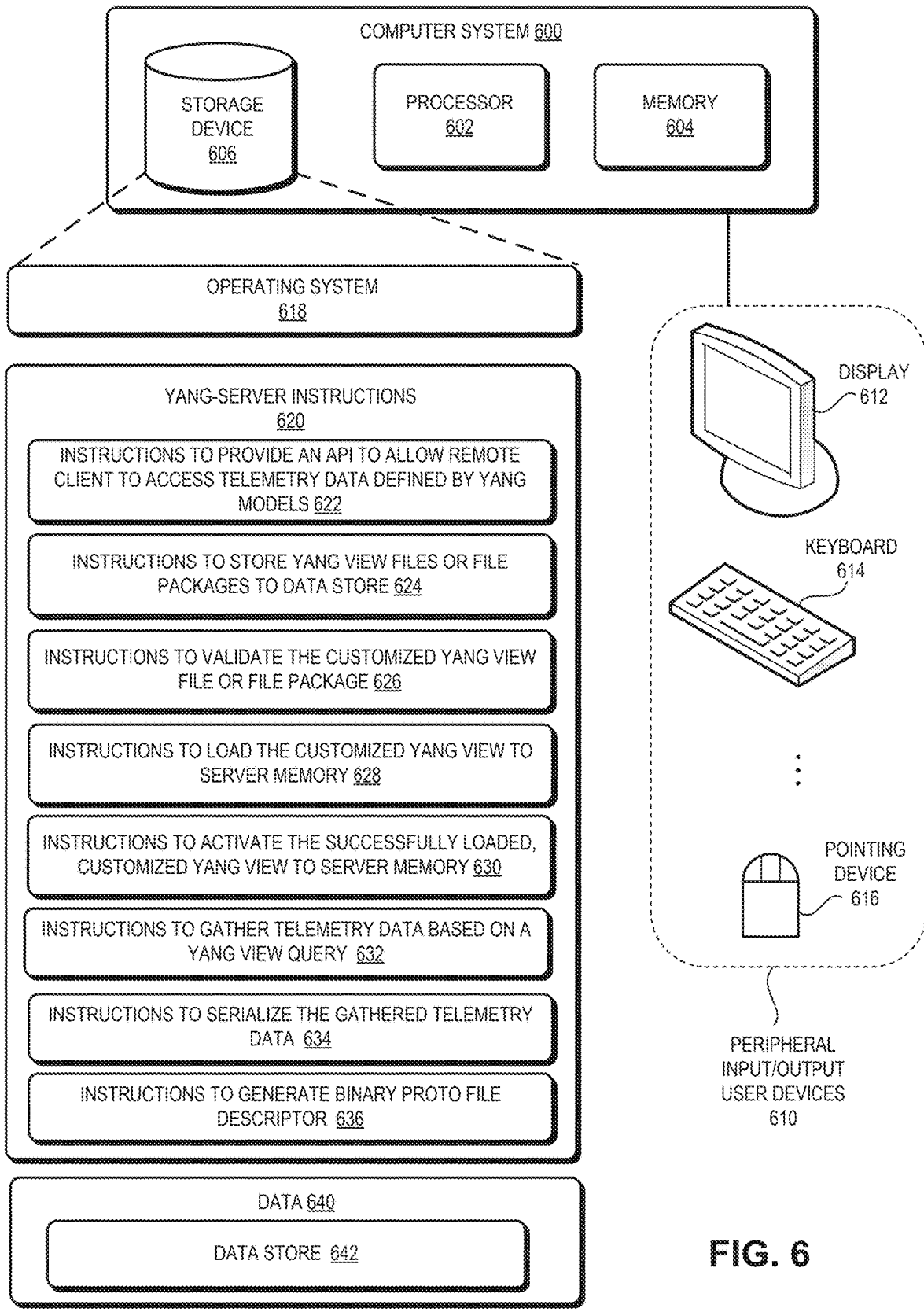
FIG. 6 illustrates a computer system 600 which facilitates YANG view injections, according to one aspect of the instant application.

FIG. 6 illustrates a computer system 600 which facilitates YANG view injections, according to one aspect of the instant application. Computer system 600 includes a processor 602, a memory 604, and a storage device 606. Furthermore, computer system 600 can be coupled to peripheral input/output (I/O) user devices 610 (e.g., a display device 612, a keyboard 614, and a pointing device 616). Storage device 606 includes a non-transitory computer-readable storage medium and stores an operating system 618, YANG-server instructions 620, and data 630. Computer system 600 may include fewer or more entities or instructions than those shown in FIG. 6. According to one aspect, computer system 600 can be implemented as part of a network device (e.g., network device 500), such as a switch, a router, an access point, a NIC, etc.

YANG-server instructions 620 may include instructions, which when executed by computer system 600, can cause computer system 600 to perform methods and/or processes described in this disclosure. Specifically, YANG-server instructions 620 may include instructions 622 to provide an API (e.g., the gRPC interface shown in FIG. 1) to allow a remote client to access the telemetry data defined by a plurality of YANG models. Each YANG model can describe data representing a particular area or feature associated with the network. For example, network data associated with a particular port (e.g., port 502 or 504 shown in FIG. 5) of the network device may be described by one YANG model, whereas network data associated with VLAN operation may be described by another YANG model. The plurality of YANG models can be part of the firmware of the network device. The API may be a YANG API, a REST API, a CLI, or an SNMP) API. According to some aspects, the remote YANG client can send a customized YANG view file or file package to the network device via the API.

YANG-server instructions 620 may include instructions 624 to store a received YANG view file or file package into a data store maintained by the network device, as described above in relation to operation 310 shown in FIG. 3. The data store may be implemented using transient or persistent storage. According to some aspects, the received YANG view file or file package may be compressed, and instructions 624 may also include instructions to decompress the received file or file package.

YANG-server instructions 620 may include instructions 626 to validate the customized YANG view file or file package, as described above in relation to operation 316 shown in FIG. 3. Validating the YANG file may involve determining whether the customized YANG view file contains an error, such as a file name error, a YANG statement error, a formatting error, etc. In some examples, validating the customized YANG file or file package may also involve determining whether the number of active YANG views on the network device reaches a predetermined maximum number. If so, a newly received customized YANG view file may be invalidated. According to further aspects, instructions 626 can update the metadata of the YANG view file or file package to indicate the state of the customized YANG view as invalid in the event of detecting an error in the YANG view file.

YANG-server instructions 620 may include instructions 628 to load a customized YANG view into the memory of the YANG server as described above in relation to operations 320 and 322 shown in FIG. 3. The memory can be part of storage device 606 and can be implemented using either persistent or ephemeral storage. YANG-server instructions 620 may include instructions 630 to activate the successfully loaded, customized YANG view, as described above in relation to operation 324 shown in FIG. 3. For example, instructions 630 can update the metadata of the successfully loaded YANG view file or file package to indicate the state of the customized YANG view as active.

YANG-server instructions 620 may include instructions 632 to gather telemetry data from various data sources on the network device based on a YANG view query sent from a remote YANG client, as described above in relation to operation 416 shown in FIG. 4. The YANG view query may specify a YANG view name, and instructions 632 may determine the modules and submodules of the YANG models used for data gathering.

YANG-server instructions 620 may include instructions 634 to serialize the gathered telemetry data before returning the data to the YANG client, as described above in relation to operation 418 shown in FIG. 4. The data may be serialized in JSON or GPB format. If GPB is used, YANG-server instructions 620 may also include instructions 636 to generate binary executable codes (referred to as the proto file descriptor) containing all the required semantics for performing GPB-based data serialization for the particular YANG view, as described above in relation to operation 320 shown in FIG. 3. The proto file descriptor can be loaded into the YANG server codes for execution, without the need to recompile or reboot the server codes.

Data 640 may include data store 642 which stores the states and configurations associated with various software and hardware components within the network device. YANG-server instructions 620 may include more instructions than those shown in FIG. 6.

Figure 7:
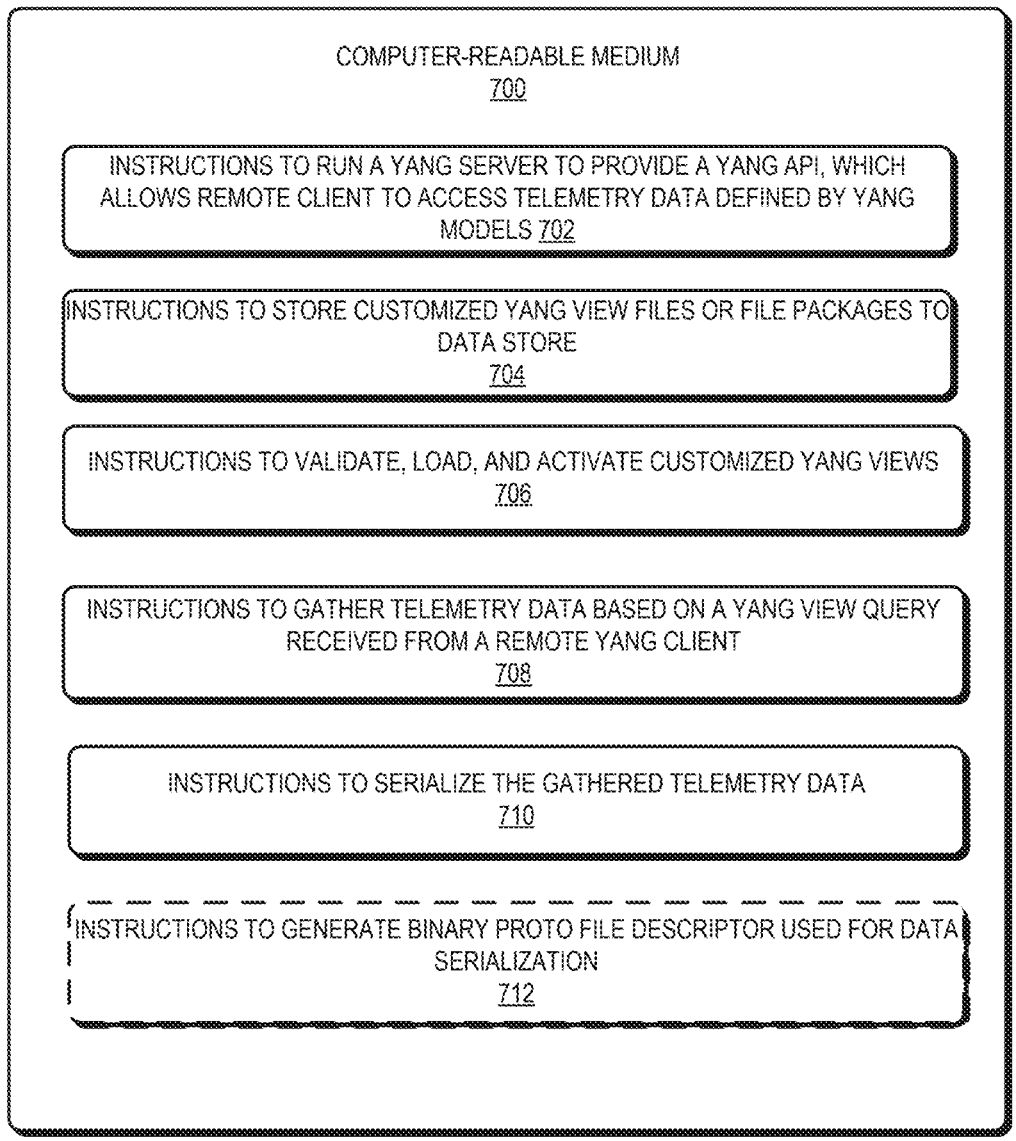
FIG. 7 illustrates a computer-readable medium (CRM) 700 which facilitates injecting customized YANG views to a network device, according to one aspect of the instant application.

FIG. 7 illustrates a computer-readable medium (CRM) 700 which facilitates injecting customized YANG views to a network device, according to one aspect of the instant application. CRM 700 can be a non-transitory computer-readable medium or device storing instructions that when executed by a computer or processor cause the computer or processor to perform a method. CRM 700 can store instructions 702 to run a YANG server (e.g., YANG server 102 shown in FIG. 1) to provide a YANG API, which allows a remote YANG client to access telemetry data defined by a plurality of YANG models (e.g., YANG models 106 shown in FIG. 1); instructions 704 to store customized YANG view files or file packages in a data store (e.g., data store 114 shown in FIG. 1), as described above in relation to operation 310 shown in FIG. 3; instructions 706 to validate, load, and activate customized YANG views (e.g., using a process shown in FIG. 3), as described above in relation to operations 316-324 shown in FIG. 3; instructions 708 to gather telemetry data based on a YANG view query received from a remote YANG client, as described above in relation to operation 416 shown in FIG. 4; instructions 710 to serialized the gathered telemetry data; and optional instructions 712 to generate binary proto file descriptor used for data serialization as described above in relation to operation 418 shown in FIG. 4.

CRM 700 may include more instructions than those shown in FIG. 7. For example, CRM 700 may store instructions for determining whether the number of active customized YANG views in the YANG server memory reaches a predetermined maximum number. If so, the instructions can invalidate a newly received customized YANG view file. In another example, CRM 700 may include instructions to keep an older version of a YANG view or a deleted YANG view active until all pending requests to that YANG view have been serviced.

In general, this disclosure describes a solution to the technical problem of allowing a network device to provide telemetry data using customized YANG views in addition to YANG views built into the device firmware without performing the firmware upgrade and rebooting the networking device. The YANG server running on the network device can receive, from a remote YANG client (which may be part of an NMS), customized YANG view files or file packages and load the customized YANG views into the server memory. The customized YANG views allow YANG clients to obtain aggregated data using a single query, thus reducing the consumption of bandwidth for transmitting the telemetry data. Because the data is aggregated at the YANG server side, the YANG client logic can be simplified and can be allowed to scale further. Moreover, given an existing YANG model, the customized YANG views can provide new ways to reimagine data and relationships by aggregating the data (e.g., creating parent/child relationships) or disaggregating data (e.g., extracting only subsets of the YANG modules). The mix-and-match approach can provide ample flexibility for consumers of the telemetry data to be very specific on what and how (in terms of structure) the telemetry data should be retrieved. To facilitate GPB-based data serialization, each YANG view file can be packaged (e.g., as a compressed tar file) along with a corresponding proto-definition file. The network device receiving the file package may create a binary executable file descriptor, which can be loaded into the running server codes. The file descriptor can be used to serialize the data gathered based on the YANG view without the need to recompile the server codes.

One aspect of the instant application describes a method, a computer system, and a computer-readable medium that facilitate the injection of customized YANG views to a network device. During operation, a network device can run a Yet Another Next Generation (YANG) server to provide telemetry data associated with the network device, the telemetry data defined by a YANG model. In response to receiving, from a remote client, a customized YANG view file, the YANG server may determine whether the customized YANG view file contains an error. In response to determining that the customized YANG view file does not contain an error, the YANG server may activate the customized YANG view file without upgrading the network device's firmware and rebooting the network device. The YANG server may receive a query from the remote client specifying the customized YANG view file, gather telemetry data based on the customized YANG view file, and return the gathered telemetry data to the remote client.

In a variation on this aspect, the YANG server may further serialize the gathered telemetry data based on a JavaScript Object Notation (JSON) data format, a Google Protocol Buffers (GPB) data format, an American Standard Code for Information Interchange (ASCII) code format, or a proprietary binary format.

In a further variation, the customized YANG view file may be packaged with a text-based GPB definition file to facilitate the YANG server to perform GPB serialization of the gathered telemetry data.

In a further variation, the GPB definition file may be generated based on the customized YANG view file and the YANG model.

In a further variation, the customized YANG view file and the GPB definition file may be packaged into a compressed tar file that is sent to the network device.

In a variation on this aspect, the customized YANG view file may be sent to the network device via a Representational State Transfer (REST) interface, a YANG interface, or a Command Line Interface (CLI).

In a variation on this aspect, the YANG server may receive, from the remote client, an updated version of the customized YANG view file and, in response to determining that all existing queries specifying the customized YANG view file are serviced, replace the customized YANG view file with the updated version.

In a variation on this aspect, in response to determining that the customized YANG view file contains an error, the YANG server may set a state of the customized YANG view file to an error state to allow the remote client to re-send the customized YANG view file.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-implemented method, comprising:
running, at a network device, a Yet Another Next Generation (YANG) server to provide telemetry data associated with the network device, the telemetry data defined by a YANG model;
in response to receiving, from a remote client, a customized YANG view file, determining whether the customized YANG view file contains an error;
in response to determining that the customized YANG view file does not contain an error, activating the customized YANG view file without upgrading the network device's firmware and rebooting the network device;
receiving a query from the remote client specifying the customized YANG view file;
gathering telemetry data based on the customized YANG view file; and
returning the gathered telemetry data to the remote client.

2. The method of claim 1, further comprising serializing the gathered telemetry data based on a JavaScript Object Notation (JSON) data format, a Google Protocol Buffers (GPB) data format, an American Standard Code for Information Interchange (ASCII) code format, or a proprietary binary format.

3. The method of claim 2, wherein the customized YANG view file is packaged with a text-based GPB definition file to facilitate the YANG server to perform GPB serialization of the gathered telemetry data.

4. The method of claim 3, wherein the GPB definition file is generated based on the customized YANG view file and the YANG model.

5. The method of claim 3, wherein the customized YANG view file and the GPB definition file are packaged into a compressed tar file that is sent to the network device.

6. The method of claim 1, wherein the customized YANG view file is sent to the network device via a Representational State Transfer (REST) interface, a YANG interface, or a Command Line Interface (CLI).

7. The method of claim 1, further comprising:
receiving, from the remote client, an updated version of the customized YANG view file; and
in response to determining that all existing queries specifying the customized YANG view file are serviced, replacing the customized YANG view file with the updated version.

8. The method of claim 1, further comprising:
in response to determining that the customized YANG view file contains an error, setting a state of the customized YANG view file to an error state to allow the remote client to re-send the customized YANG view file.

9. A network device, comprising:
at least one processing resource; and
at least one non-transitory machine-readable storage medium comprising instructions executable by the processing resource to:
run a Yet Another Next Generation (YANG) server to provide telemetry data associated with the network device, the telemetry data defined by a YANG model;
in response to receiving a customized YANG view file from a remote client, determine whether the customized YANG view file contains an error;
in response to determining that the customized YANG view file does not contain an error, activate the customized YANG view file without upgrading the network device's firmware and rebooting the network device;
receive a query from the remote client specifying the customized YANG view file;
gather telemetry data based on the customized YANG view file; and
return the gathered telemetry data to the remote client.

10. The network device of claim 9, the instructions further to serialize the gathered telemetry data based on a JavaScript Object Notation (JSON) data format, a Google Protocol Buffers (GPB) data format, an American Standard Code for Information Interchange (ASCII) code format, or a proprietary binary format.

11. The network device of claim 10, wherein the customized YANG view file is packaged with a text-based GPB definition file to facilitate the YANG server to perform GPB serialization of the gathered telemetry data.

12. The network device of claim 11, wherein the customized YANG view file and the GPB definition file are packaged into a compressed tar file that is sent to the network device.

13. The network device of claim 9, wherein the customized YANG view file is sent to the network device via a Representational State Transfer (REST) interface, a YANG interface, or a Command Line Interface (CLI).

14. The network device of claim 9, the instructions further to:
receive, from the remote client, an updated version of the customized YANG view file; and
in response to determining that all existing queries specifying the customized YANG view file are serviced, replace the customized YANG view file with the updated version.

15. The network device of claim 9, the instructions further to:
in response to determining that the customized YANG view file contains an error, set a state of the customized YANG view file to an error state to allow the remote client to re-send the customized YANG view file.

16. A non-transitory computer-readable storage medium storing instructions to:
run, at a network device, a Yet Another Next Generation (YANG) server to provide telemetry data associated with the network device, the telemetry data defined by a YANG model;
in response to receiving a customized YANG view file from a remote client absent of a firmware update on the network device, determine whether the customized YANG view file contains an error;
in response to determining that the customized YANG view file does not contain an error, activate the customized YANG view file without upgrading the network device's firmware and rebooting the network device;
receive a query from the remote client specifying the customized YANG view file;
gather telemetry data based on the customized YANG view file; and
return the gathered telemetry data to the remote client.

17. The non-transitory computer-readable storage medium of claim 16, the instructions further to serialize the gathered telemetry data based on a JavaScript Object Notation (JSON) data format, a Google Protocol Buffers (GPB) data format, an American Standard Code for Information Interchange (ASCII) code format, or a proprietary binary format.

18. The non-transitory computer-readable storage medium of claim 17, wherein the customized YANG view file is packaged with a text-based GPB definition file to facilitate the YANG server to perform GPB serialization of the gathered telemetry data.

19. The non-transitory computer-readable storage medium of claim 16, wherein the customized YANG view file is sent to the network device via a Representational State Transfer (REST) interface, a YANG interface, or a Command Line Interface (CLI).

20. The non-transitory computer-readable storage medium of claim 16, the instructions further to:
receive, from the remote client, an updated version of the customized YANG view file; and
in response to determining that all existing queries specifying the customized YANG view file are serviced, replace the customized YANG view file with the updated version.

* * * * *